US010735692B2

(12) United States Patent
Seavey

(10) Patent No.: US 10,735,692 B2
(45) Date of Patent: Aug. 4, 2020

(54) ROBOTIC INSPECTION SYSTEM FOR HIGH MAST LIGHT POLES

(71) Applicant: INFRASTRUCTURE PRESERVATION CORPORATION, Clearwater, FL (US)

(72) Inventor: William Seavey, Clearwater, FL (US)

(73) Assignee: INFRASTRUCTURE PRESERVATION CORPORATION, Clearwater, FL (US)

(*) Notice: Subject to any disclaimer, the term of this patent is extended or adjusted under 35 U.S.C. 154(b) by 93 days.

(21) Appl. No.: 15/969,172

(22) Filed: May 2, 2018

(65) Prior Publication Data
US 2018/0324388 A1 Nov. 8, 2018

Related U.S. Application Data

(60) Provisional application No. 62/500,024, filed on May 2, 2017.

(51) Int. Cl.
H04N 5/232 (2006.01)
H04N 7/18 (2006.01)
G01N 21/952 (2006.01)
G01S 17/88 (2006.01)
G01B 17/02 (2006.01)
G06T 7/00 (2017.01)
G01N 21/95 (2006.01)
H04N 5/247 (2006.01)
G01S 17/89 (2020.01)
G01S 7/481 (2006.01)
G01S 17/86 (2020.01)

(52) U.S. Cl.
CPC ............ H04N 7/181 (2013.01); G01B 17/02 (2013.01); G01N 21/952 (2013.01); G01N 21/9515 (2013.01); G01S 17/88 (2013.01); G06T 7/0004 (2013.01); H04N 5/232 (2013.01); H04N 5/232061 (2018.08); H04N 5/247 (2013.01); G01N 2201/021 (2013.01); G01S 7/4813 (2013.01); G01S 17/86 (2020.01); G01S 17/89 (2013.01); Y10S 901/01 (2013.01)

(58) Field of Classification Search
CPC ...... H04N 7/181; G01B 17/02; G01N 21/952; G01S 17/88
USPC ....................................................... 348/148
See application file for complete search history.

(56) References Cited

U.S. PATENT DOCUMENTS 3,805,054 A 4/1974 Wolf
7,006,211 B1 2/2006 Belew et al.
8,666,553 B2 3/2014 Phillips et al.
(Continued)

Primary Examiner — Nguyen T Truong
(74) Attorney, Agent, or Firm — Allen, Dyer et al.

(57) ABSTRACT

A high mast light pole inspection system includes a command center and a transport vehicle. The transport vehicle has a frame configured to be secured around a high mast light pole, and a plurality of sets of wheels. Each set of wheels has a spring mechanism that biases a respective set of wheels inward towards a center of the frame. The plurality of sets of wheels are wirelessly controlled from the command center. In addition, the transport vehicle includes a plurality of cameras mounted to the frame, a power supply coupled to each set of wheels and camera, and a RF digital video transmitter coupled to the plurality of cameras. The transmitter is configured to transmit a wireless multiplexed output of the cameras to the command center.

15 Claims, 7 Drawing Sheets

(56) References Cited

U.S. PATENT DOCUMENTS

| | | |
|---|---|---|
| 2006/0287835 A1 | 12/2006 | Sheth et al. |
| 2007/0186671 A1 | 8/2007 | Rogers et al. |
| 2013/0061696 A1 | 3/2013 | Cabuz |
| 2013/0127452 A1* | 5/2013 | Boenisch ............ G01N 27/9033 324/242 |
| 2015/0090504 A1 | 4/2015 | Bagherri et al. |
| 2016/0161436 A1 | 6/2016 | Marashdeh et al. |

* cited by examiner

ROBOTIC INSPECTION SYSTEM FOR HIGH MAST LIGHT POLES

RELATED APPLICATION

The present invention is related to U.S. Provisional Patent Application Ser. No. 62/500,024 filed May 2, 2017, the entire contents of which are incorporated herein by reference.

TECHNICAL FIELD

The present invention relates to the field of structural inspections, and, more particularly, to a robotic inspection system for high mast light poles and related methods.

BACKGROUND

High mast light poles are typically several hundred feet tall, which makes it difficult to perform reliable inspections of the upper portions of a pole. Existing methods of inspecting the structural condition of high mast light poles is visually using binoculars from a ground location. These methods do not allow a significantly close inspection of the poles for flaws.

Alternatively, the inspector can use a combination of binoculars and a bucket truck to get to a higher level on the pole. However, the bucket truck is expensive and may require partial lane closures and impact traffic flow. In addition, being high up in a bucket truck is also dangerous to the inspector. Even if the inspector uses a bucket truck, most bucket trucks do not have the reach to raise to the top portion of the poles. Accordingly, what is needed is an inspection system that can perform inspections of the high mast light poles safely and with increased coverage from the bottom to the top.

SUMMARY

In a particular embodiment, a high mast light pole transport inspection system is disclosed. The inspection system includes a command center and a transport vehicle. The transport vehicle has a frame configured to be secured around a high mast light pole, and a plurality of sets of wheels. Each set of wheels has a spring mechanism that biases a respective set of wheels inward towards a center of the frame, where the spring mechanism for each respective set of wheels has a first end suspended from the frame, and a second end secured to the respective set of wheels.

The plurality of sets of wheels are wirelessly controlled from the command center. In addition, the transport vehicle includes a plurality of cameras, a power supply coupled to each set of wheels and cameras, and a RF digital video transmitter coupled to the plurality of cameras. The transmitter is configured to transmit a wireless multiplexed output of the cameras to the command center.

A ring is concentrically secured to the frame and configured to rotate relative to the frame, and the cameras are mounted to the ring. The transport vehicle also includes a plurality of drive rollers fixedly secured to the frame, where the ring rests on and is supported by the plurality of drive rollers and configured to cause the ring to rotate relative to the frame.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The robotic inspection system implements high definition video during the inspection of the high mast light poles. This allows an inspector from the comfort of his office to visually see any imperfections in the pole, seams and luminaries. In addition, the video is stored to create a history of each of the inspections. Accordingly, a comparison with each subsequent inspection cycle can be performed to determine rates of deterioration over time as well as reporting rust, cracking or areas that may need immediate attention. The advanced assessment shows all of the details required and are much less subjective. The inspection system provides complete coverage of all the elements of the entire high mast light pole including the pole, seams and luminaries.

Figure 1:
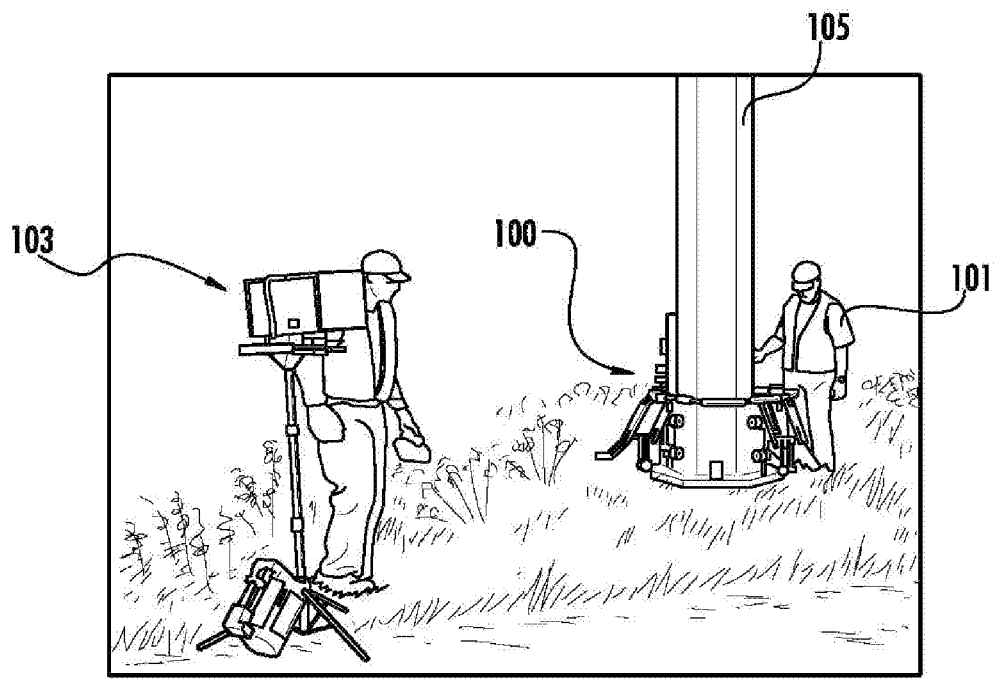
FIG. 1 is a picture of a transport vehicle being installed at a base of a high mast light pole.

Referring now to FIGS. 1-4, a transport vehicle 100 used with the robotic inspection system is shown being secured around a light pole 105 by an inspector 101. A command center 103 is also shown in FIG. 1 on a stand and in the process of being synchronized to the transport vehicle 100 by an operator 103. The transport vehicle 100 is a comprehensive maneuverable inspection device that can travel up, down and around the high mast light pole 105. The transport vehicle 100 is configured to visually inspect the high mast light poles 105 and luminaries 107 and the inspection can be recorded. The transport vehicle 100 may include a high definition multi-camera multiplexed video monitoring system (e.g., 1080i and 60 fps).

Figure 2:
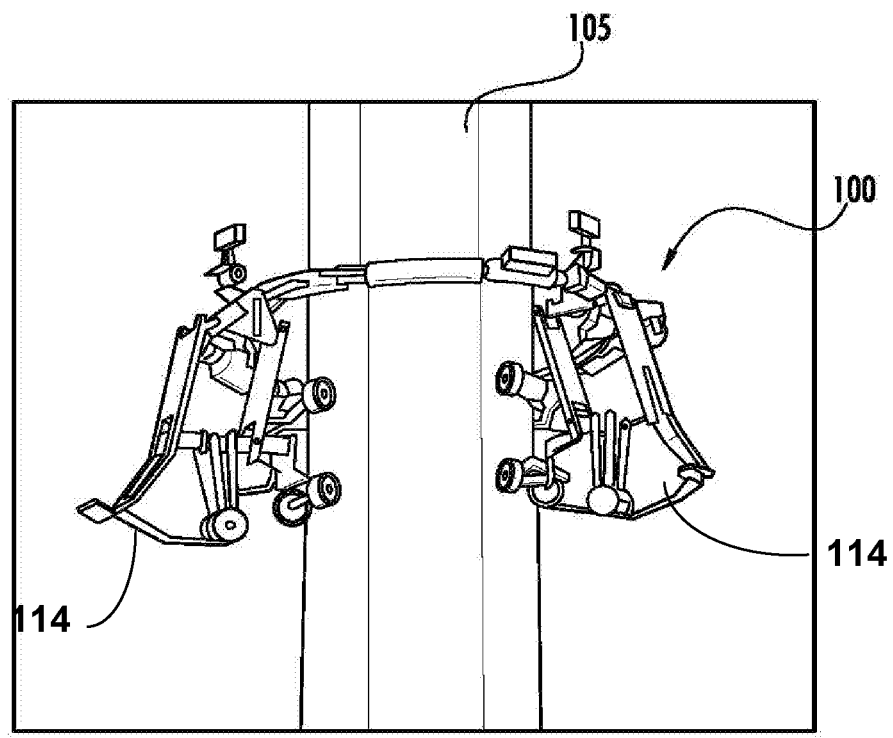
FIG. 2 is a picture of the transport vehicle traveling up the high mast light pole under its own power.

In addition, real time monitoring of the exterior surface of the light pole 105 can be done as the transport vehicle 100 traverses the light pole 105 as shown in FIG. 2. Each set of wheels has a spring mechanism that biases a respective set of wheels inward towards a center of the frame, where a spring mechanism for each respective set of wheels has a first end suspended from the frame, and a second end secured to the respective set of wheels. As can be appreciated by those of ordinary skill in the art, the unique configuration of the spring mechanism, as shown in FIG. 2, generates the compressive forces required for the wheels to not slip on the surface of the light pole 105. In a particular embodiment, the spring mechanism includes at least one constant force spring 114 that is comprised of a rolled ribbon of spring steel.

Figure 3:
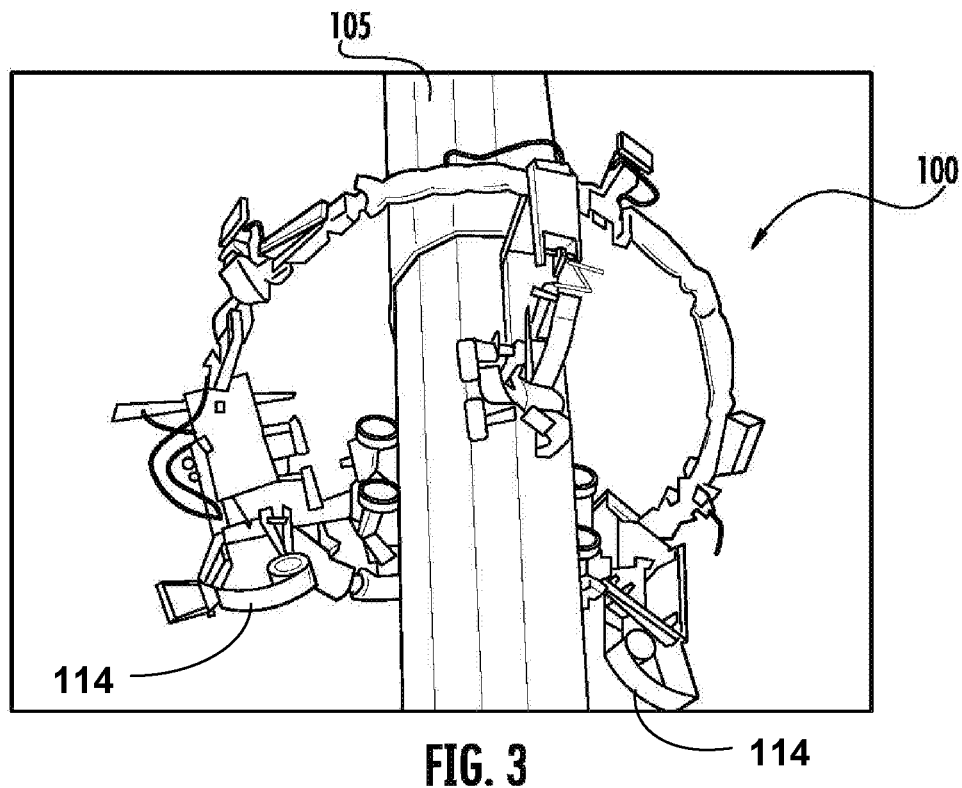
FIG. 3 is a picture of the transport vehicle in a stopped position to take video and pictures at a particular location on the high mast light pole.
Figure 4:
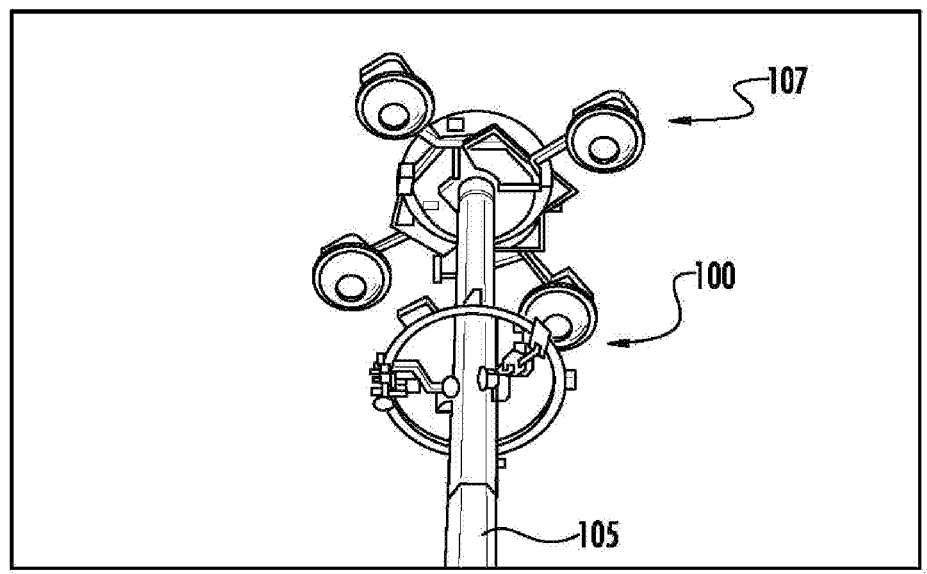
FIG. 4 is a picture of the transport vehicle proximate the top of the high mast light pole.

The transport vehicle 100 may include wireless communications equipment in order to receive command and control signals and also to wirelessly transmit video. The transport vehicle 100 may include one or more cameras for the inspection, but typically four cameras are used to obtain a full 360 degree view of the light pole 105. For example, the transport vehicle 100 may have cameras mounted on a frame that are configured for inspection and may be aimed down onto the light pole 105 as shown in FIG. 3. The output of the cameras may be High Definition Multimedia Interface (HDMI) to provide high quality moving images (video) and a high quality video recording (e.g., 1080i and 60 fps). The camera lens zoom and focus features are typically fixed but may be variable. In addition, each of the cameras may be mounted on an angle adjustment mechanism that allows the respective camera to pivot up and down. Thus, the cameras can provide a view that can assist in navigation and view the light pole 105 and luminaries 107 that the transport vehicle 100 cannot fully reach as shown in FIG. 4. The pivoting cameras are adapted to tilt up and look ahead and visually inspect the light pole 105 and also to inspect the luminaries 107. The control of the angle of the respective camera may be accomplished by the remote controls.

The transport vehicle 100 is configured to mount to the light pole 105 and travel the length and circumference of the light pole 105 while being fully controlled and monitored remotely. The wheels for the vehicle transport 100 may comprise rubber adapted for griping the light pole 105 and for mobility. The wheels may be configured to steer and navigate around the light pole 105. The transport vehicle 100 is adapted to circumnavigate the light pole 105 using the cameras and is able to transverse the light pole 105 up and down from the base to the top of the light pole by the rotation of the wheels.

Electric motors that drive the wheels for the transport vehicle 100 may each include a pulse encoder that generates a pulse for each distance of rotation of the respective wheel. For example, the electric motor may generate a pulse for clockwise rotation that is different from counter-clockwise rotation. The pulses indicate a set distance traveled in order to calculate how far the transport vehicle 100 has traveled in a direction up the light pole 105. The transport vehicle 100 is configured to gradually accelerate and decelerate in order to not spin the wheels.

As shown in more detail in FIGS. 8-13 discussed below, the transport vehicle 100 includes a circular frame that is configured to be secured around the light pole 105, where the frame is configured to swing open and closed about a hinge pin in order to secure the transport vehicle 100 around a light pole 105. In a particular embodiment, the transport vehicle 100 includes three sets of wheels secured to the frame, and each set of wheels is configured to be rotated to drive the transport vehicle 100 along the light pole 105. The sets of wheels each include a spring mechanism that results in the wheels being biased inward towards the center of the frame. The spring mechanism forces the wheels of the transport vehicle 100 to make secure contact to the light pole 105. The spring mechanism has sufficient tension so that as the transport vehicle 100 travels up the light pole 105 and the diameter of the light pole 105 decreases, the wheels maintain sufficient friction contact to prevent the transport vehicle 100 from slipping back down the light pole 105.

At least one camera is coupled to the transport vehicle 100 and configured to capture high quality images (e.g. 24 MP). In a particular embodiment there are four cameras to provide overlapping coverage during the inspection. The transport vehicle 100 may include a power supply in electrical communication with the cameras and each set of wheels.

Figure 5:
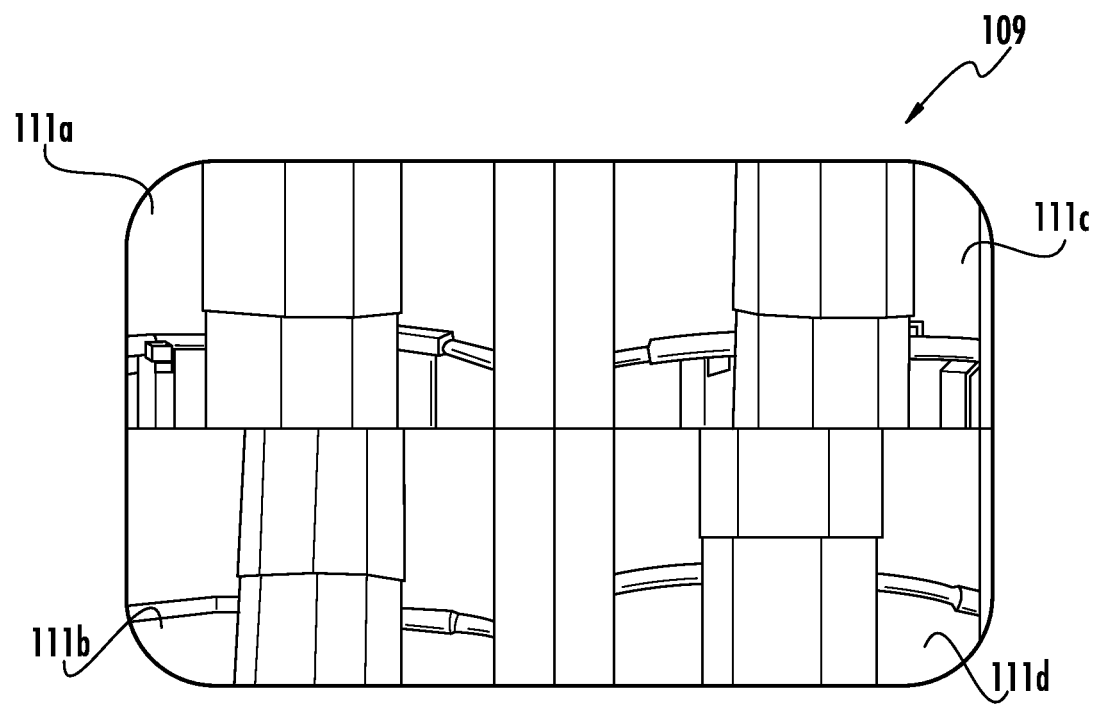
FIG. 5 is a video feed displayed at the command center from the location of the transport vehicle shown in FIG. 3.
Figure 6:
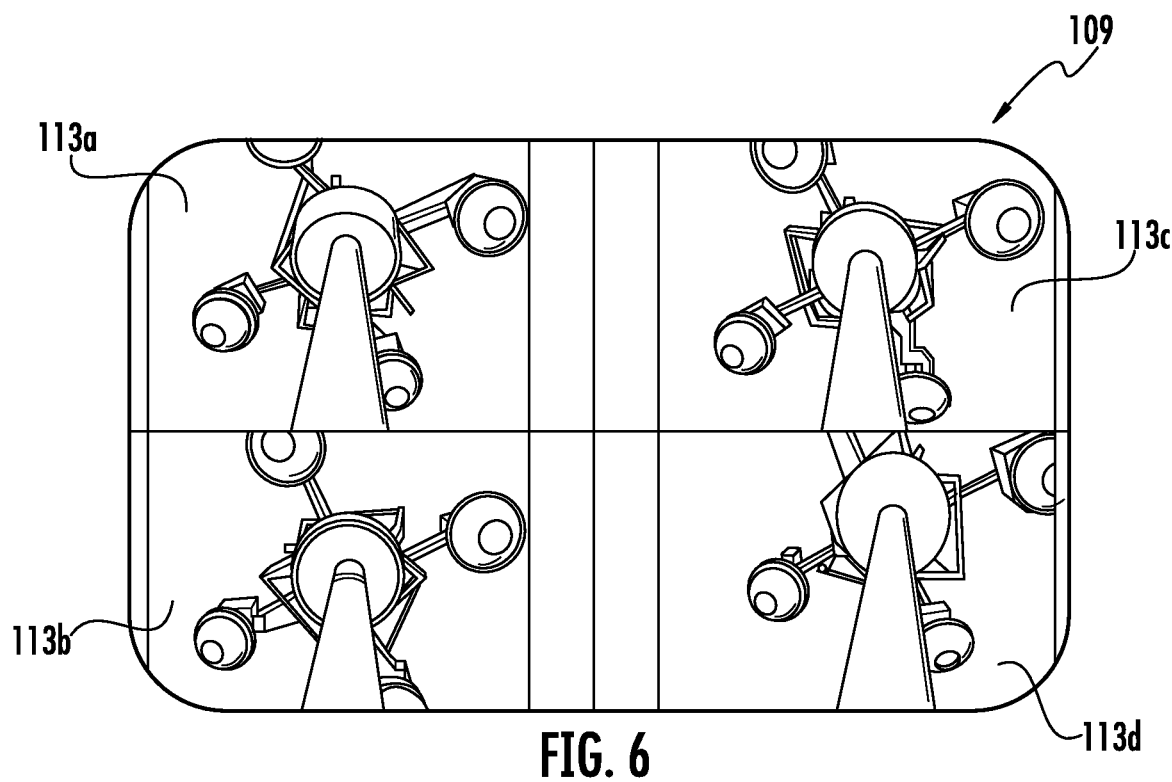
FIG. 6 is a video feed displayed at the command center with the cameras of the transport vehicle pointed upward towards the luminaries as the transport vehicle is moving upwards.
Figure 7:
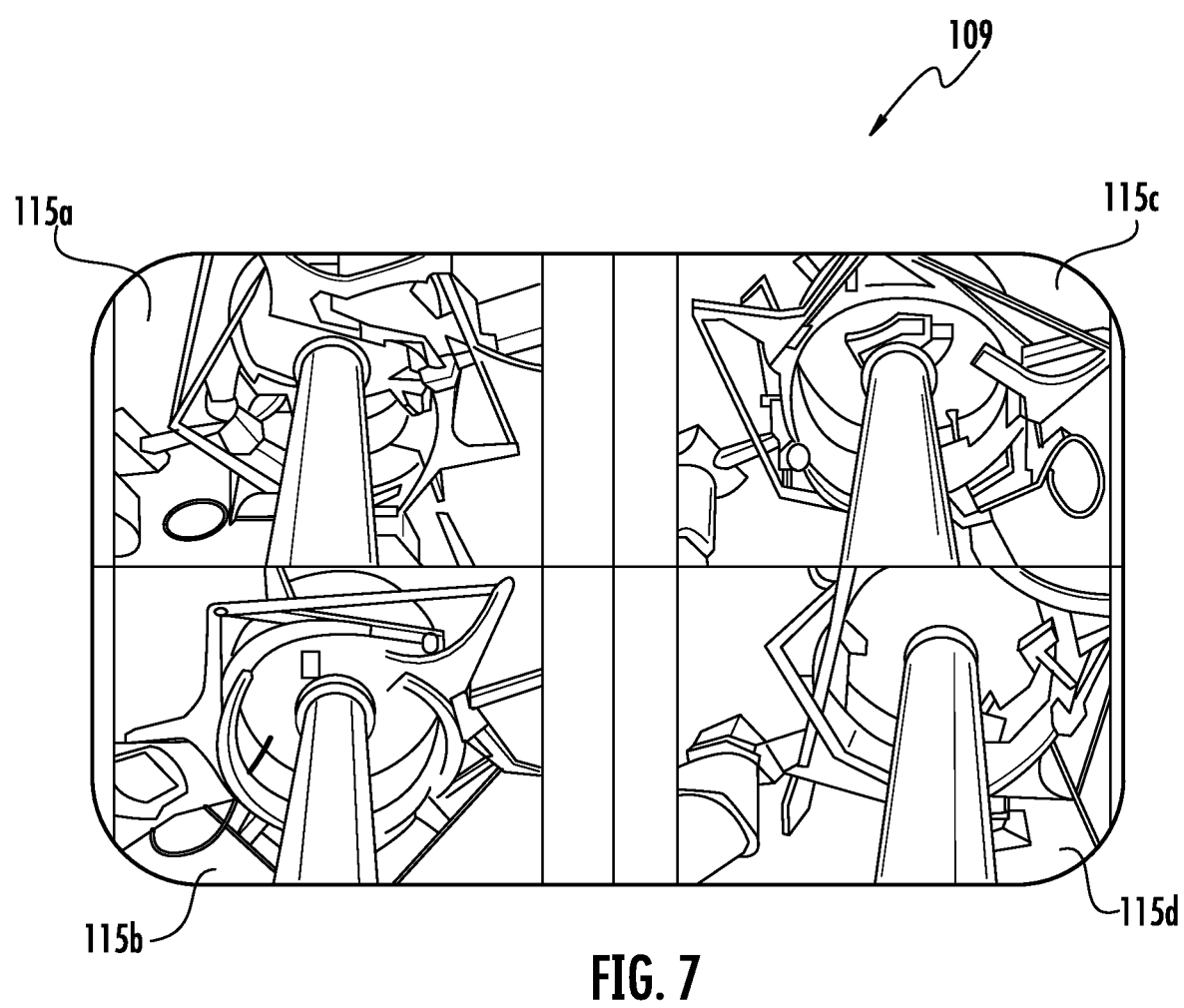
FIG. 7 is a video feed displayed at the command center with the cameras of the transport vehicle pointed upward towards the luminaries at the top of the high mast light pole.

Referring now to FIGS. 5-7, a video monitor 109 display of a command center 103 is shown that is used in cooperation with the transport vehicle 100 and the cameras. The views shown in FIG. 5 from each camera is assigned a quadrant in the display 111a, 111b, 111c, 111d, in order to inspect completely around the surface of the light pole 105. In a particular embodiment, the controls are wireless controls that transmits signals to the transport vehicle 100. For example, wireless signals may be transmitted to the sets of wheels to drive forward or in reverse. In addition, the electric motors coupled to each of the set of wheels may be configured to generate a signal correlating to a distance along the light pole 105 that the transport vehicle moves 100. This signal can be transmitted back to the command center 103.

As described above, the command center 103 may include a base housing a video monitor 109 that is used for displaying images from the video cameras mounted to the transport vehicle 100. As shown in FIG. 6, the wireless video capability of the inspection system allows the transport vehicle 100 to transmit a wireless multiplexed output of the four cameras through a wireless RF digital video transmitter and provide images from each camera in a respective quadrant 113a, 113b, 113c, 113d. The multiplexing of the four cameras allows all the cameras to be transmitted in one signal. The multiplexer may be part of one or more the cameras.

In operation, the transport vehicle 100 is latched around the light pole 105. The spring mechanism is adjusted for each set of wheels to confirm the attachment of the transport vehicle 100 to the light pole 105 is sufficient. The transport vehicle 100 is then powered up. The transport vehicle 100 is configured to perform a short diagnostic to insure that the communications are working and that the mechanical robotics are functional and remote controllable.

The next step is to make sure all cameras are moving and controllable. Once the cameras are confirmed to be online, the cameras are aligned onto the light pole 105. This is to confirm that all the way around the light pole 105 is visible. The next step is to confirm that the video is of high quality from all the cameras. The cameras should also be consistent from one to the other. If a camera is out of compliance, that camera is replaced with a replacement camera of the same model. Once all the cameras are operational, a record unit of the command center 103 is activated and the transport vehicle 100 is checked for maneuverability up and down the light pole 105. Once all functionalities are confirmed, then the recording is checked for performance and quality. In addition, the power system is checked for appropriate amps and voltage.

The transport vehicle 100 is then deployed up the light pole 105 towards the top end of the light pole 105. When the transport vehicle 100 reaches an end point, the cameras may be tilted up to view and record the condition of the luminaries 107 and the light pole 105 as shown in FIG. 7. The views from each camera is assigned to a quadrant 115a, 115b, 115c, 115d, in the display. Movement of the transport vehicle 100 is paused while the recorded video is reviewed for any points of interest or to determine if the video is missing an area of the light pole 105. The transport vehicle 100 is then monitored and any additional areas recorded as the transport vehicle 100 travels downward back to the base of the light pole 105.

If a point of concern or a fault is found on the light pole 105, the location is recorded. Once the transport vehicle 100 has finished the inspection and is back to the point that it was mounted, the transport vehicle 100 can be removed and prepared to be mounted to the next light pole 105.

Figure 8:
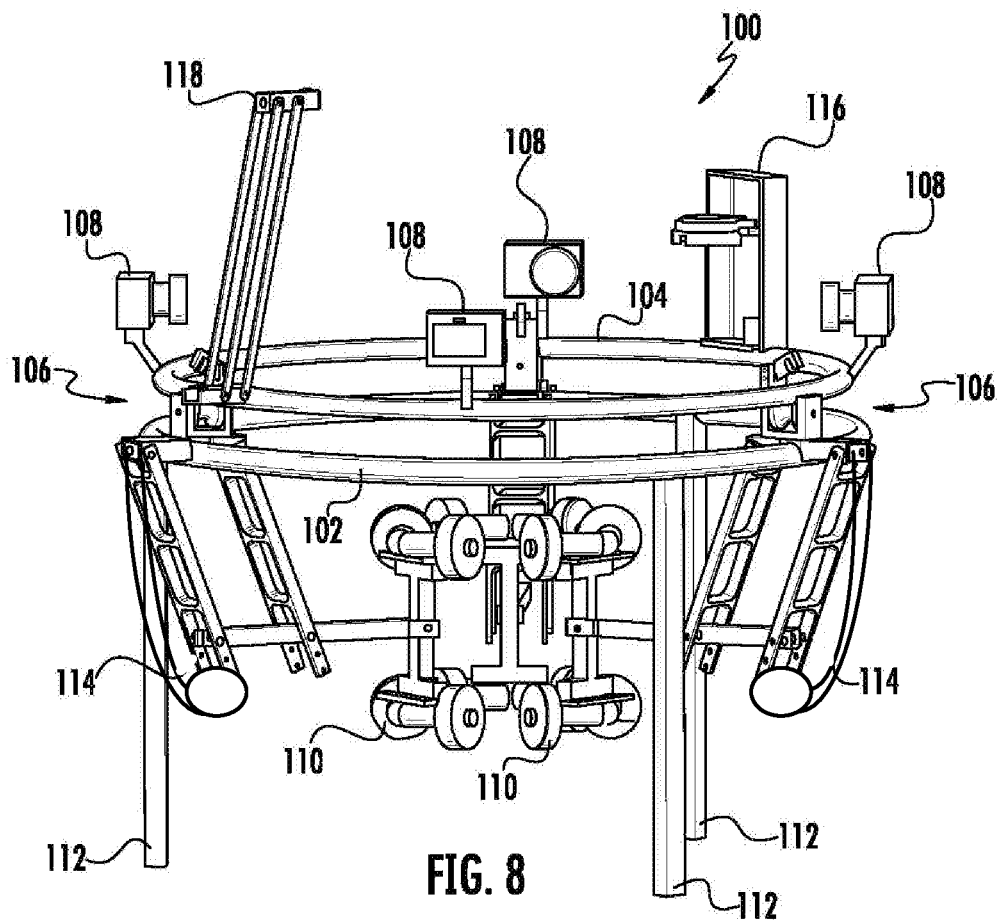
FIG. 8 is a front perspective view of a second embodiment of the transport vehicle.
Figure 9:
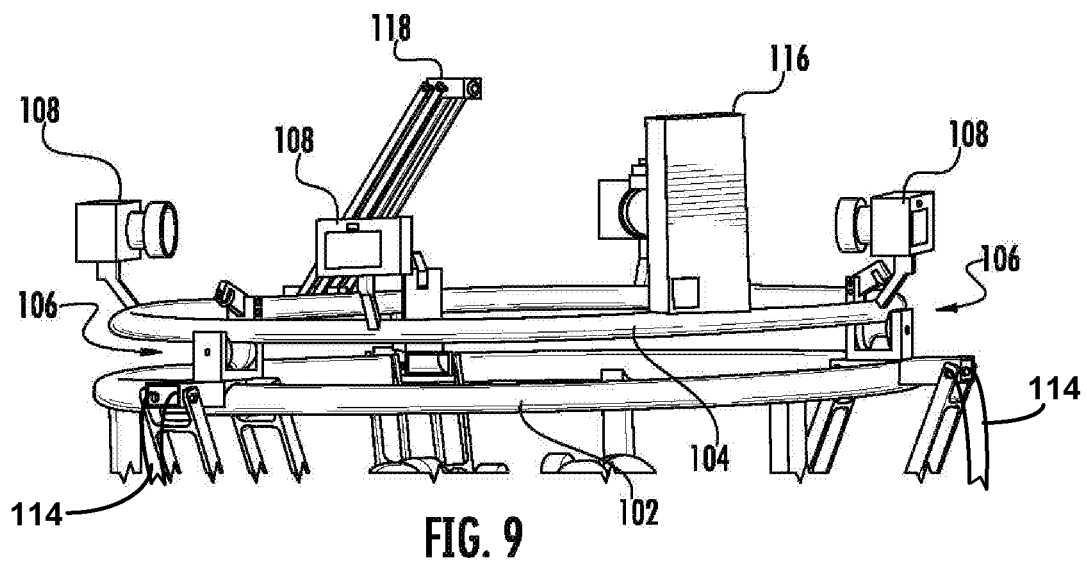
FIG. 9 is a partial rear perspective view of the transport vehicle shown in FIG. 8.
Figure 10:
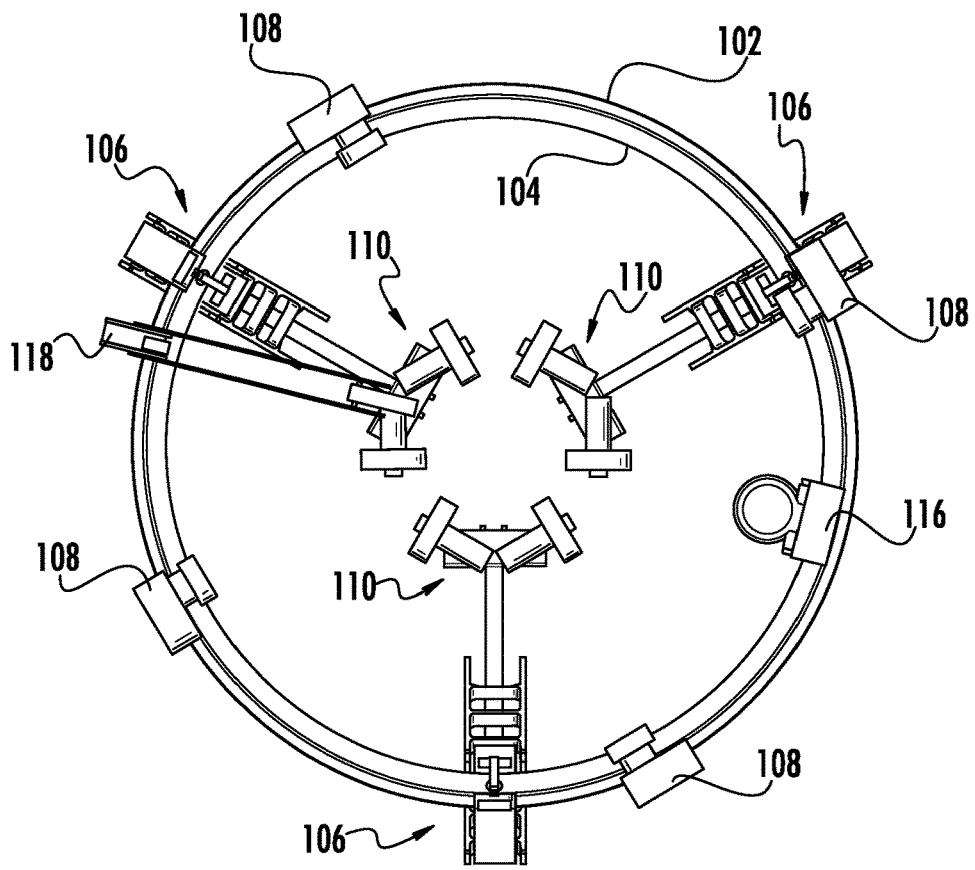
FIG. 10 is a top view of the transport vehicle shown in FIG. 8.

Referring now to FIGS. 8-10, a second embodiment of the transport vehicle 100 is illustrated. The transport vehicle 100 includes a support ring 102, and a rotating ring 104. Three driving rollers 106 are spaced apart and between a top surface of the support ring 102 and a lower surface of the rotating ring 104. The drive rollers 106 are configured to cause the rotating ring 104 to rotate relative to the support ring 102.

Cameras 108, LIDAR 116 for measuring cracks, and an ultrasonic device 118 for measuring thickness are mounted to the rotating ring 104. Accordingly, the rotating ring 104 can be rotated around the light pole so that the cameras 108, the LIDAR 116, and the ultrasonic device 118 can be rotated to the damaged areas to take pictures and measurements.

Each set of wheels 110 is connected to a respective spring mechanism 114, which in turn is connected to the support ring 102. The spring mechanism 114 is configured to force the wheels 110 inwards towards the light pole. In a particular embodiment, the spring mechanism 114 includes at least one constant force spring that is comprised of a rolled ribbon of spring steel. Additional constant force springs may be used depending on the load so that additional springs are required to keep the wheels 110 from slipping on the light pole.

There may also be legs 112 that extend down from the support ring 102. The legs 112 are used to support the transport vehicle 100 off the ground as the transport vehicle 100 is being secured to, or removed from, the light pole.

Figure 11:
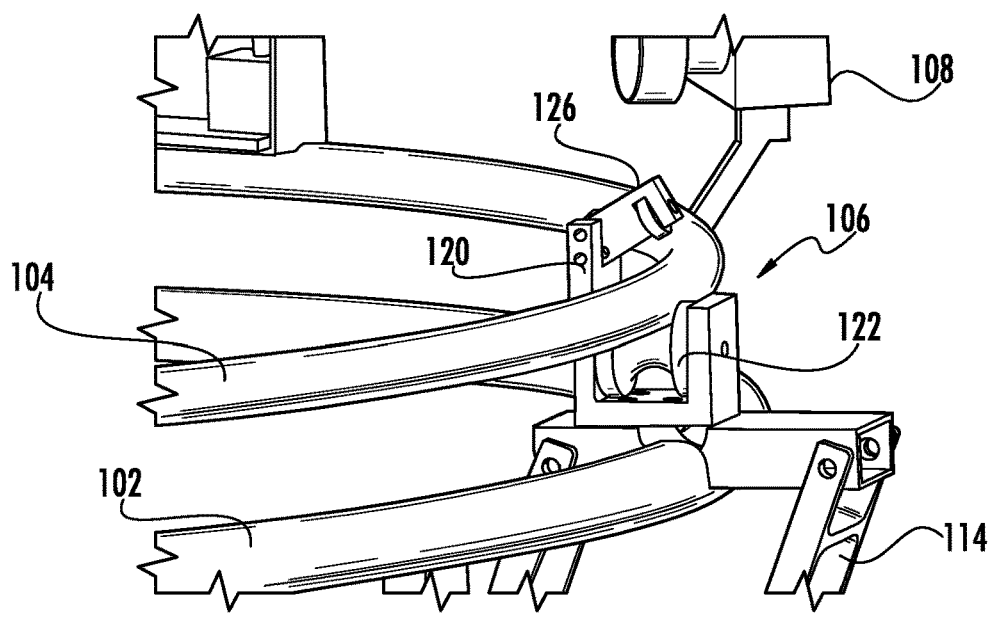
FIG. 11 is a detail view of the drive roller for a rotating ring of the transport vehicle shown in FIG. 8.

Referring now to FIG. 11, the driving roller 106 is shown in more detail and comprises a J-shaped frame element having a roller 122 secured therein. The rotating ring 104 rests on and is supported by the roller 122. An electric driving motor wheel 126 is clamped down over a top surface of the rotating ring 104. The electric driving motor wheel 126 is configured to cause the rotating ring 104 to move over the roller 122 as the electric driving motor wheel 126 is activated.

Figure 12:
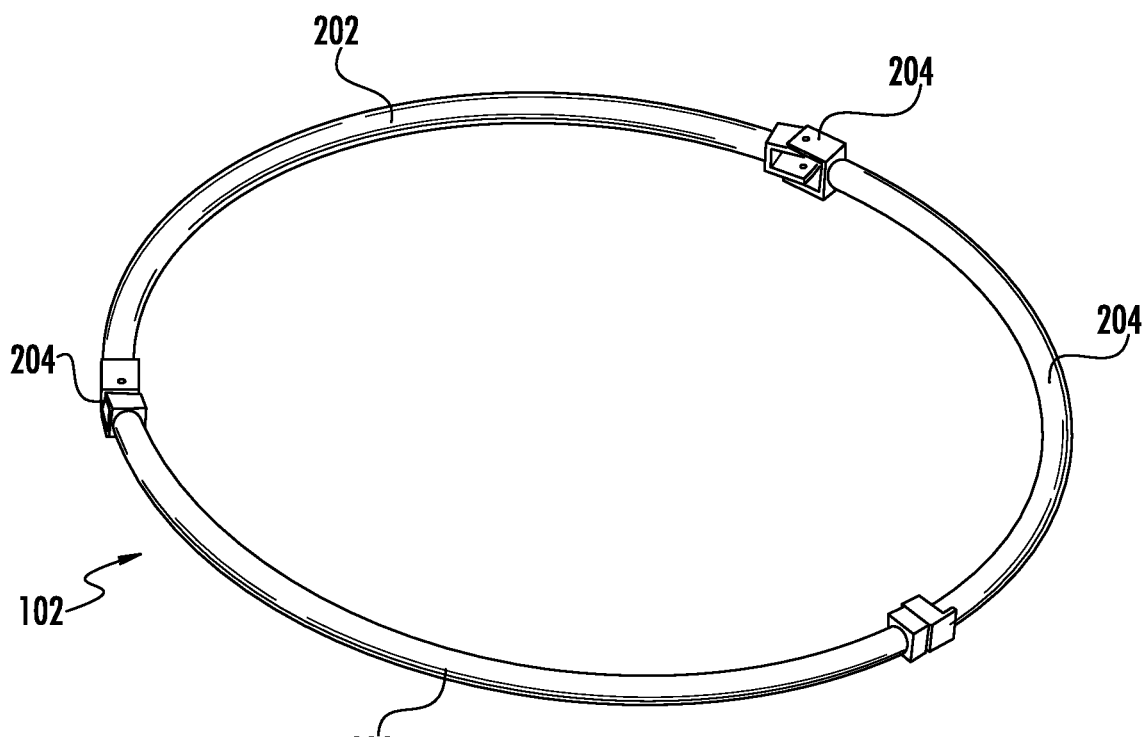
FIG. 12 is a perspective view of a support ring of the transport vehicle shown in FIG. 8.
Figure 13:
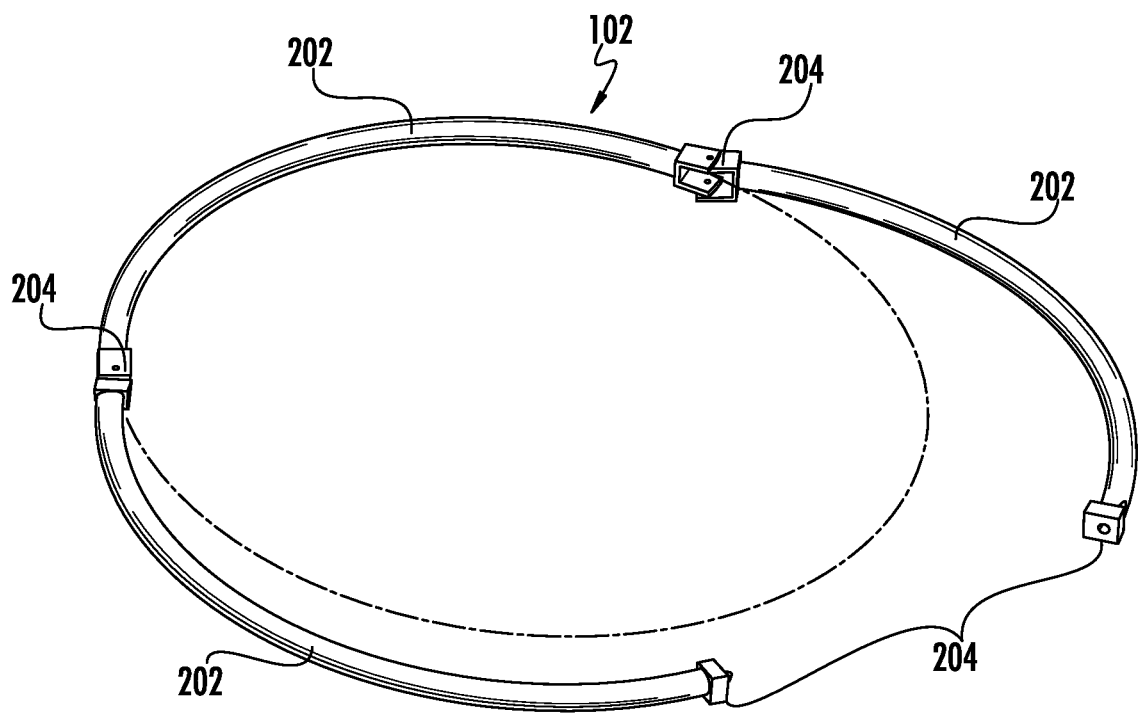
FIG. 13 is a perspective view of the support ring of FIG. 12 being disassembled.

Referring now to FIGS. 12 and 13, the support ring 102 includes three sections 202, which are connected together by couplings 204. Accordingly, the support ring 102 can be disassembled into smaller sections by releasing the couplings 204.

An advantage of the transport vehicle and inspection system described above is that the transport vehicle is robotic and is able to maneuver remotely. The transport vehicle has sufficient gripping power to maintain a solid and consistent connection between the light pole and the wheels that travels up the light pole.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A high mast light pole inspection system comprising:
a command center; and
a transport vehicle comprising
a frame configured to be secured around a high mast light pole,
a plurality of sets of wheels mounted to the frame, each set of wheels having a spring mechanism biasing a respective set of wheels inward towards a center of the frame,
a power supply coupled to each set of wheels,
a ring secured to the frame and configured to be positioned to encircle the high mast light pole and to rotate around the high mast light pole independently from movement of the frame,
at least one camera mounted to the ring, wherein the at least one camera is configured to rotate around the high mast light pole with the ring,
an RF digital video transmitter coupled to the at least one camera, and configured to transmit a output of the at least one camera to the command center.

2. The high mast light pole inspection system of claim 1, wherein the spring mechanism for each respective set of wheels has a first end suspended from the frame, and a second end secured to the respective set of wheels.

3. The high mast light pole inspection system of claim 1, wherein each set of wheels is equidistantly spaced apart along the frame from an adjacent set of wheels.

4. The high mast light pole inspection system of claim 1, wherein the plurality of sets of wheels comprises three sets of wheels.

5. The high mast light pole inspection system of claim 4, wherein each set of wheels comprises four individual wheels.

6. The high mast light pole inspection system of claim 1, further comprising a plurality of drive rollers fixedly secured to the frame, wherein the ring rests on and is supported by the plurality of drive rollers and configured to cause the ring to rotate relative to the frame.

7. The high mast light pole inspection system of claim 6, further comprising a light detection and ranging device (LIDAR) mounted to the ring and configured to measure cracks of a high mast light pole.

8. The high mast light pole inspection system of claim 6, further comprising an ultrasonic device mounted to the ring and configured to measure thickness.

9. The high mast light pole inspection system of claim 6, wherein the plurality of drive rollers are controlled by wireless signals transmitted from the control center.

10. A high mast light pole inspection system comprising:
a frame configured to be secured around a high mast light pole;
a plurality of sets of wheels suspended from the frame and equidistantly spaced apart on the frame;
a spring biasing each respective set of wheels inward towards a center of the frame;
a power supply coupled to each set of wheels;
a ring secured to the frame and configured to be positioned to encircle the high mast light pole and to rotate around the high mast light pole independently from movement of the frame; and at least one camera mounted to the ring, wherein the at least one camera is configured to rotate around the high mast light pole with the ring.

11. The high mast light pole inspection system of claim 10, further comprising an RF digital video transmitter coupled to the at least one camera and configured to transmit output of the at least one camera to the command center.

12. The high mast light pole system of claim 10, further comprising a plurality of drive rollers fixedly secured to the frame, wherein the ring rests on and is supported by the plurality of drive rollers and configured to cause the ring to rotate relative to the frame.

13. The high mast light pole system of claim 12, further comprising a light detection and ranging device (LIDAR) mounted to the ring and configured to measure cracks of a high mast light pole.

14. The high mast light pole system of claim 12, further comprising an ultrasonic device mounted to the ring and configured to measure thickness.

15. A high mast light pole inspection system comprising:
a frame configured to be secured around a high mast light pole;
a plurality of sets of wheels mounted to the frame, each set of wheels having a spring mechanism biasing a respective set of wheels inward towards a center of the frame;
a ring secured to the frame and configured to be positioned to encircle the high mast light pole and to rotate around the high mast light pole independently from movement of the frame;
at least one camera mounted to the ring, wherein the at least one camera is configured to rotate around the high mast light pole with the ring;
a power supply coupled to each set of wheels and the at least one camera;
an RF digital video transmitter coupled to the at least one camera, and configured to transmit output to a command center; and
a plurality of drive rollers fixedly secured to the frame, wherein the ring rests on and is supported by the plurality of drive rollers and configured to cause the ring to rotate relative to the frame;
wherein the spring mechanism for each respective set of wheels has a first end suspended from the frame, and a second end secured to the respective set of wheels.

* * * * *